July 31, 1956  T. J. R. BRIGHT  2,756,468
SEALING STRIPS
Filed Nov. 2, 1953
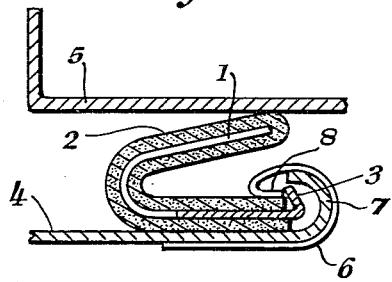
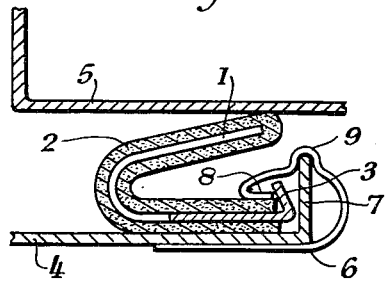
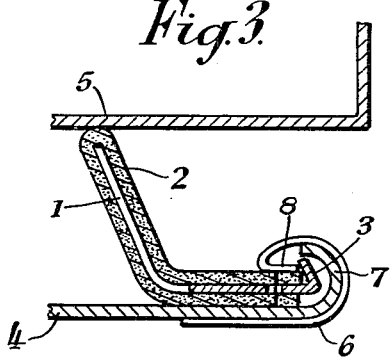
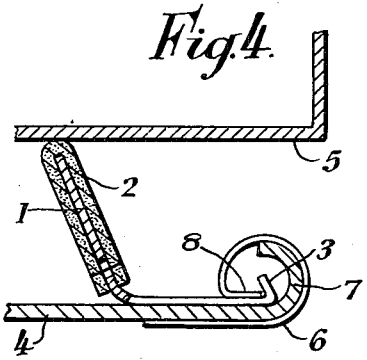
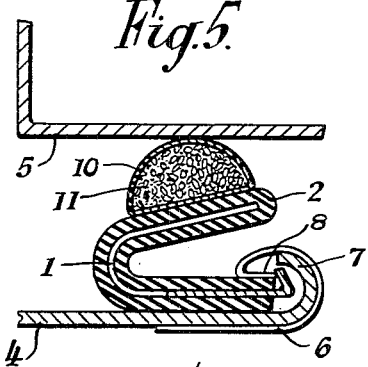
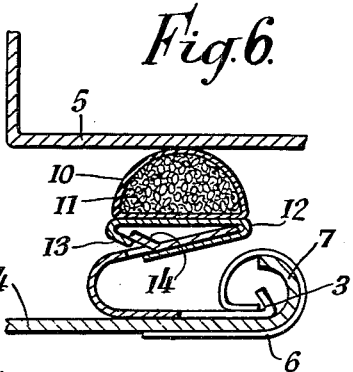
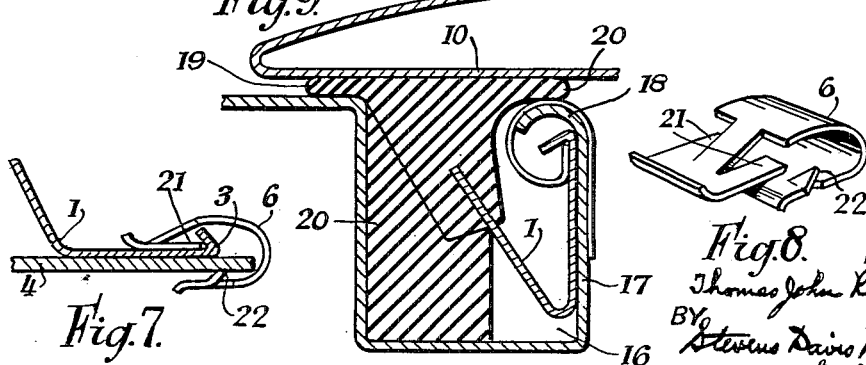
INVENTOR
Thomas John Robert Bright
BY Stevens Davis Miller & Mosher
his ATTORNEYS

United States Patent Office 2,756,468
Patented July 31, 1956

2,756,468

SEALING STRIPS

Thomas John Robert Bright, Warwick, England

Application November 2, 1953, Serial No. 389,692

Claims priority, application Great Britain
November 4, 1952

6 Claims. (Cl. 20—69)

The sealing strip forming the subject of the present invention has been designed primarily for use with aircraft engine cowlings where it is desired to provide a good seal between two spaced component members where both may be fixed or where there may be relative movement between the components in a rotational or axial sense. The present invention is also applicable to provide a seal for uses other than on aircraft such, for example, as a seal around the boot opening of a car, car door openings or other hinged closure members in general. For the purpose of this specification the members between which the sealing strip is to be positioned are referred to as co-operating members.

It is proposed in accordance with the present invention to form the seal from a strip-like component of metal or other material that is substantially stiff and flexible in a small degree only, the strip-like component having a protective covering extending partially or wholly over one or both sides and composed of a flexible material such, for example, as asbestos cloth, rubber, synthetic rubber, flexible plastic material or woven textile material possibly composed of or incorporating glass fibers, the strip-like component being secured to or located on one co-operating member so that it may engage or lie sufficiently close to the other co-operating member to provide a good seal between the two co-operating members.

It is preferred that the strip-like component should be of metal and that it should be formed with slots regularly spaced apart throughout its length to give the necessary slight degree of flexibility the slots being staggered and projecting inwardly from opposite edges of the strip, the length of the slots being a little more than half the width of the strip-like component. Alternatively the slots may extend from one side of the strip-like component only or be disposed at regular intervals centrally of the strip leaving each marginal edge complete. It is furthermore preferred that the strip-like component should be bent along its length to have a substantially U-shaped or other bent or curved cross section and still further that the cross section shall be formed with an inwardly directed lip or projection extending along the length of the strip-like component which assists in positively locking the strip-like component in position upon the cowling or other co-operating member with which it is to be associated. The strip-like component may also be formed from wire suitably bent, for example, into a zig-zag shape and further bent to give the U-shaped or other cross section.

In order to secure the sealing strip thus formed to a co-operating member it is preferred that a series of tags made from spring material should be employed these tags being so shaped or formed as to embrace the edge of the co-operating member and to clamp together the edge of the co-operating member and one edge of the sealing strip. It is preferred that the tags should be formed with tangs which project inwardly to engage the lip or like projection formed on the strip-like component and thus sold the sealing strip firmly in position on the co-operating member, leaving the unclamped edge of the sealing strip free to engage the other of the co-operating members.

Referring to the drawings:

Figures 1 to 7 are sectional views illustrating various alternative constructions;

Figure 8 is a perspective view of the clip shown in Figure 7;

Figure 9 is a sectional view illustrating one form of the invention applied to a vehicle boot lid.

Referring in the first case to Figures 1 and 2 of the accompanying drawings, the sealing strip comprises a strip-like component 1 which is of substantially U or V shape in cross section, the component having a covering 2 of asbestos cloth or other suitable flexible covering material, the covering material being stitched, adhesively secured or otherwise maintained in position upon the component 1. The covering 2 may either completely enclose component 1 the covering being in the form of a flexible tube, the material being pressed into the mouth of the U-shaped component or alternatively as shown one edge of the U-shaped component may project from the covering and may include an upstanding lip 3.

It is intended that the sealing strip shall be carried by one of two co-operating members such as 4, the free opposite edge of the sealing strip either engaging the second co-operating member 5 or being so closely positioned thereto as to provide a sufficiently good seal.

The sealing strip in Figures 1 and 2 is held in position by means of a series of spaced clips 6 which may conveniently be of spring steel. The member 4 is provided with an inwardly turned edge 7 which in the case of Figure 1 is of curved formation or alternatively of right angle formation as in the case of Figure 2. The clips 6 are bent to embrace the part 7 and have their operative extremity turned inwardly as at 8 to override the lip 3 and thereby positively lock the sealing strip in position on the member 4. In the case of Figure 2 the clips 6 are crimped as at 9 where they override the upstanding edge of the part 7.

Referring now to Figures 3 and 4 of the drawings the part 1 is of wide angle V formation and the covering 2 is arranged to either virtually enclose the component 1 as in Figure 3 or is fore-shortened as in Figure 6 in which case the metal component 1 will contact the member 4. In both cases a series of clips of the same general shape as in Figure 1 are used for holding the sealing strip in position. In both cases the covering 2 contacts the member 5 or is in such close proximity thereto as to ensure a sufficiently good seal.

In the case of Figures 5 and 6 a substantially V or U shaped component 1 is used, but in both these cases instead of the actual covering material 2 making sealing engagement with the member 5 the component 1 or its associated covering carries an effective portion 10 which may be composed of natural or synthetic rubber or any other suitable resilient material which will provide a good seal when engaging the member 5. The component 10 may have an associated covering 11 by means of which it may be adhesively or otherwise secured in position on the covering 2 of the component 1 in the case of Figure 5. Alternatively as in the case of Figure 6 the part 10 may be carried by a clip-like member 12 which forms a platform for the part 10, one end of the component 12 indicated by reference numeral 13 being sprung over a pressed out tang 14 of the component 1. In both cases a series of clips 6 of somewhat similar form to those previously described are used for holding the sealing strip in position on the member 4.

In Figures 1 to 6 the part 4 has either a right angled or inwardly curved edge to receive the clip, the latter being of quite a simple construction. For dealing with a part which is not so shaped at its edge as, for example, as shown in Figure 7 the clip may be shaped as in Figures 7 and 8. As will be seen clearly in Figure 8 the clip is formed with two spaced tangs 21 which engage the lip 3 of the component 1. The clip may, if required, be formed with upwardly pressed tangs 22 which tend to bite into the underface of the part 4 and thereby hold the clip frictionally in position thereon. In this construction the component 1 is shown without an external covering but such a covering may be used if required or the component 1 may carry a separate sealing member as, for example, in Figure 6.

In the case of Figure 9 the invention is shown, for example, applied to the sealing of a lid 15 of a vehicle boot the opening or mouth of the boot being surrounded by a drain channel 16, the channel being bordered internally by a flange 17 on which the sealing strip is mounted. The upper extremity of the flange 17 is turned over as at 18 to receive a number of spring clips 6 which over-ride a lip 3 on the metal strip-like component 1, the latter being of substantially V shape and carrying an effective portion 10 which may conveniently be of rubber or other suitable resilient material. It will be appreciated that the lid 15 will close down on to the part 10, the latter being formed with projecting flanges 19 and 20 which make good sealing engagement with the main structure. The interior of the drainage channel 16 may contain a rubber or like component 20 with which the part 10 can co-operate.

In all the constructions described it is preferred that the strip-like metal component 1 shall be formed with a series of slots throughout its length which are spaced apart and are staggered, the slots projecting inwardly from opposite edges whereby the component 1 when bent into U or V shape can be bent to follow curves of quite small radius.

It will be appreciated that in some cases as, for example, when used as a sealing strip for sealing structural parts of aircraft which are subjected to air pressure during flight that the pressure of the air may be so arranged that it will act on the sealing strip to force the latter more firmly into sealing engagement with the part 5.

It is preferred that the covering material 2 shall be of a fire resisting material such as asbestos cloth, fibre glass material or other well-known heat or fire resisting material. Alternatively on the other hand where it may merely be necessary that the strip should be resistant to the action of oil or liquid fuel the covering material may be conveniently of synthetic rubber.

I claim:

1. A sealing strip for interposition between two spaced co-operating members comprising an inherently stiff but resilient strip-like component bent longitudinally throughout its length so that it is of substantially V shape in cross section, sealing material on at least one side of said component and a series of clips for securing one side of the component in position on one member with the sealing material in sealing relation to the other member.

2. A sealing strip for interposition between two spaced co-operating members comprising an inherently stiff but resilient strip-like component bent longitudinally throughout its length so that two sides define a V shape in cross section, sealing material on at least one of said sides, a series of clips for detachably securing the component in position on one of the members with one of its sides parallel thereto and with the sealing material on the other of said sides in bearing engagement with the other of said members.

3. A sealing strip for interposition between two spaced co-operating members comprising an inherently stiff but resilient strip-like component bent longitudinally throughout its length so that it is of substantially V shape in cross section, a covering material substantially enveloping said component, a series of clips for detachably securing one side of the component in position on one member with its other side in sealing engagement with the other member.

4. A sealing strip for interposition between two spaced co-operating members comprising an inherently stiff but resilient strip-like component bent longitudinally throughout its length so that it is of substantially V shape in cross section the strip-like component as a result of it being bent longitudinally including two transverse limbs, a series of clips for detachably securing one limb of the component in position on the one member and a soft but resilient seal proper carried by the free limb and resiliently engaging the opposite member.

5. A sealing strip for interposition between two spaced co-operating members comprising an inherently stiff but resilient strip-like component bent longitudinally throughout its length so that it is of substantially V shape in cross section the strip-like component as a result of it being bent longitudinally including two transverse limbs one of which is bent up along one edge to form a lip, a series of clips engaging one limb of the strip-like component adjacent the lip for detachably securing the component in position on one member and sealing material on the other of said limbs.

6. A sealing strip for interposition between two spaced co-operating members comprising an inherently stiff but resilient strip-like component bent longitudinally throughout its length so that it is of substantially V shape in cross section the strip-like component as a result of it being bent longitudinally including two transverse limbs defining an angle greater than 90°, one limb being bent up along one edge to form a lip, a series of clips for detachably gripping said one limb of the strip-like component adjacent the lip and one of the members to hold the same together and sealing material on the other limb of said component.

References Cited in the file of this patent

FOREIGN PATENTS

| | | |
|---|---|---|
| 522,025 | Great Britain | June 6, 1940 |
| 939,443 | France | Apr. 19, 1948 |
| 132,934 | Australia | May 30, 1949 |